(12) United States Patent
Hung

(10) Patent No.: US 9,551,434 B1
(45) Date of Patent: Jan. 24, 2017

(54) METHOD OF INSPECTING SWITCHING TIME WITH FLUID CONTROL VALVE

(71) Applicant: Fei-Che Hung, Taoyuan (TW)

(72) Inventor: Fei-Che Hung, Taoyuan (TW)

( * ) Notice: Subject to any disclaimer, the term of this patent is extended or adjusted under 35 U.S.C. 154(b) by 0 days.

(21) Appl. No.: 14/809,530

(22) Filed: Jul. 27, 2015

(51) Int. Cl.
*F16K 37/00* (2006.01)

(52) U.S. Cl.
CPC ....... *F16K 37/0083* (2013.01); *F16K 37/0075* (2013.01); *Y10T 137/0396* (2015.04)

(58) Field of Classification Search
CPC .............. F16K 37/0083; F16K 37/0075; Y10T 137/0396
USPC .................... 137/554, 556, 556.3, 553, 552.7
See application file for complete search history.

(56) References Cited

U.S. PATENT DOCUMENTS

| | | | |
|---|---|---|---|
| 4,836,974 A * | 6/1989 | Ezekoye et al. .... | F16K 37/0008 116/277 |
| 5,348,036 A * | 9/1994 | Oksanen et al. ......... | G05D 7/03 137/1 |
| 7,472,884 B2 * | 1/2009 | Nishida et al. ........... | F01L 9/04 137/553 |
| 8,714,515 B2 * | 5/2014 | Nannan et al. ........... | F15B 9/03 137/553 |

* cited by examiner

*Primary Examiner* — Kevin Lee
(74) *Attorney, Agent, or Firm* — Chung-Ming Shih; HDLS IPR Services

(57) ABSTRACT

A method of inspecting switching time with fluid control valve used for inspecting operating time to turn-on or turn-off a valve door of a fluid control valve is disclosed. The method comprises following steps: firstly provide an inspector with a counting unit, a timer, a first limited switch and a second limited switch. The counting unit electrically connects to the timer and a pneumatic module of fluid control valve, the first limited switch and second limited switch connect to the timer, and the first limited switch contacts the rod of the fluid control valve rod. Then, input basic data of corresponding fluid control valve, which comprises operating conditions of the fluid control valve. Next, activate the pneumatic module and start to time, and the axial shift generated by the rod of the fluid control valve triggers the second limited switch to stop timing. Lastly, record and display operating time.

10 Claims, 3 Drawing Sheets

On-Off Valve Test/Calibration Record — 120

Client Name Column : ⸺122
Engineering Name Column: ⸺124
File Name Column: On-Off Valve ▼
Number Selection Column : 1 ▼   —128   126
Data Input Column: PV- ▼  Ametek ▼  ------------ ▼  FC ▼  Setting   ⸺130
Action Execution:                                     ON  OFF
                  1300      1302        1304    1306

FIG.2

On-Off Valve Test/Calibration Record — 120

Client Name Column: _____ —122
Engineering Name Column: _____ —124
File Name Column: _____ [▼]
Number Selection Column: [1 ▼] —126, 128
Data Input Column: [PV- ▼] [Ametek ▼] [----------- ▼] [FC ▼] [Setting]  — 1300, 1302, 1304, 1306, 130
Action Execution: [ON] [OFF]

Calibration Data

| Selection | No. | Brand | Serial Number | Action | Upstroke Time (sec) | Downstroke Time (sec) |
|---|---|---|---|---|---|---|
| 1 | 467899 | Ametek | 346566778--- | FC ▼ | 20.00 | 20.00 |
| 2 | PV- | Ametek | 099876543--- | FC ▼ | 20.00 | 20.00 |
| 3 | PV- | Ametek | ---------------- | FC ▼ | 20.00 | 20.00 |
| 4 | PV- | Ametek | ---------------- | FC ▼ | 20.00 | 20.00 |
| 5 | PV- | Ametek | ---------------- | FC ▼ | 20.00 | 20.00 |
| 6 | PV- | Ametek | ---------------- | FC ▼ | 20.00 | 20.00 |
| 7 | PV- | Ametek | ---------------- | FC ▼ | 20.00 | 20.00 |
| 8 | PV- | Ametek | ---------------- | FC ▼ | 20.00 | 20.00 |
| 9 | PV- | Ametek | ---------------- | FC ▼ | 20.00 | 20.00 |
| 10 | PV- | Ametek | ---------------- | FC ▼ | 20.00 | 20.00 |

Note:
Inspector: __ / / __ —44    Verifier: __ / / __ —45

FIG. 3

METHOD OF INSPECTING SWITCHING TIME WITH FLUID CONTROL VALVE

BACKGROUND OF THE INVENTION

Field of the Invention

The present invention relates to an inspecting method, in particular relates to a used for an inspecting method for inspecting turn-on or turn-off time of a fluid control valve.

Description of Prior Art

The fluid control valve is a control device used in fluid line piping. The basic function is interconnecting or switching the fluids in the piping, adjusting the flowing direction, pressure and flow rate of the fluid so as to assure the piping system operates normally.

The fluid control valve controls whether the fluids flows in the piping and the flow rate via turn-on and turn-off the valve door. Nonetheless, the operating time as the fluid control valve turning-on or turning-off affects the flowing efficiencies of the fluids in the piping. Accordingly, it is desired to provide an effective method for inspecting the flowing behaviors.

SUMMARY OF THE INVENTION

One of the objectives of the present invention is to provide a method of inspecting switching time with fluid control valve.

In order to achieve the above objective, an embodiment according to the technologies disclosed in the invention provides a method of inspecting switching time with fluid control valve. The method is used for inspecting turn-on or turn-off time of a fluid control valve. The fluid control valve comprises a valve body. A rod is installed in the valve body. A travel pointer is disposed on the rod, and a valve core is connected to the bottom of the rod. A valve door is disposed in the piping, when the valve core contacts the valve door; the fluid is stopped from flowing through the valve body. The top of the rod on the fluid control valve connects to a pneumatic module. The pneumatic module comprises a chamber, a gas delivery a tube, an electromagnetic valve and a pressure control valve. A diaphragm is disposed in the chamber. The gas delivery tube interconnects the chamber. The electromagnetic valve and pressure control valve are respectively disposed on gas delivery tube. The pressure control valve is used for controlling the gas volume flowing into the chamber. The electromagnetic valve is used for controlling if the gas is delivered to the chamber.

The method of inspecting switching time with fluid control valve comprises following steps: a) providing an inspector, the inspector comprising a counting unit, a power, a first limited switch and a second limited switch, the counting unit electrically connected to the pressure control valve, the power electrically connected to the counting unit and the electromagnetic valve, the first limited switch and the second limited switch disposed on the valve body electrically connected to the counting unit; b) inputting basic data of the corresponding fluid control valve, the basic data comprising operating conditions of the fluid control valve; c) driving the electromagnetic valve and starting to time upon the travel pointer moving away from the first limited switch; d) stopping timing upon the travel pointer touching the second limited switch; and recording the operating time.

In other embodiments according to the technologies disclosed in the invention, the method further comprises a step f) displaying the operating time; or comprises a step g) displaying the basic data and the operating time.

In addition, before step b, the method further comprises a step b0) displaying a data creating screen. Wherein, the data creating screen comprises an engineer name column, a file name column, a number selection column and a data input column; and the data input column comprises a number selection column, a brand selection column, a serial number selection column and an action selection column.

Also, the inspector further comprises a display, an operating interface, an output interface and a timer, a display. The operating interface, the output interface and the timer respectively electrically connect to a counting unit; the display is used for displaying basic data, the data creating screen and operating time, the operating interface is used for inputting the basic data; the output device is used for saving the basic data and a report of operating time. The timer electrically connects between the counting unit and the position sensor and is used for counting the operating time.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

FIG. 2 is a schematic diagram of the creating data screen according to the present invention;

FIG. 3 is a schematic diagram of inspection report of fluid control valve according to the present invention.

DETAILED DESCRIPTION OF THE INVENTION

Figure 1:
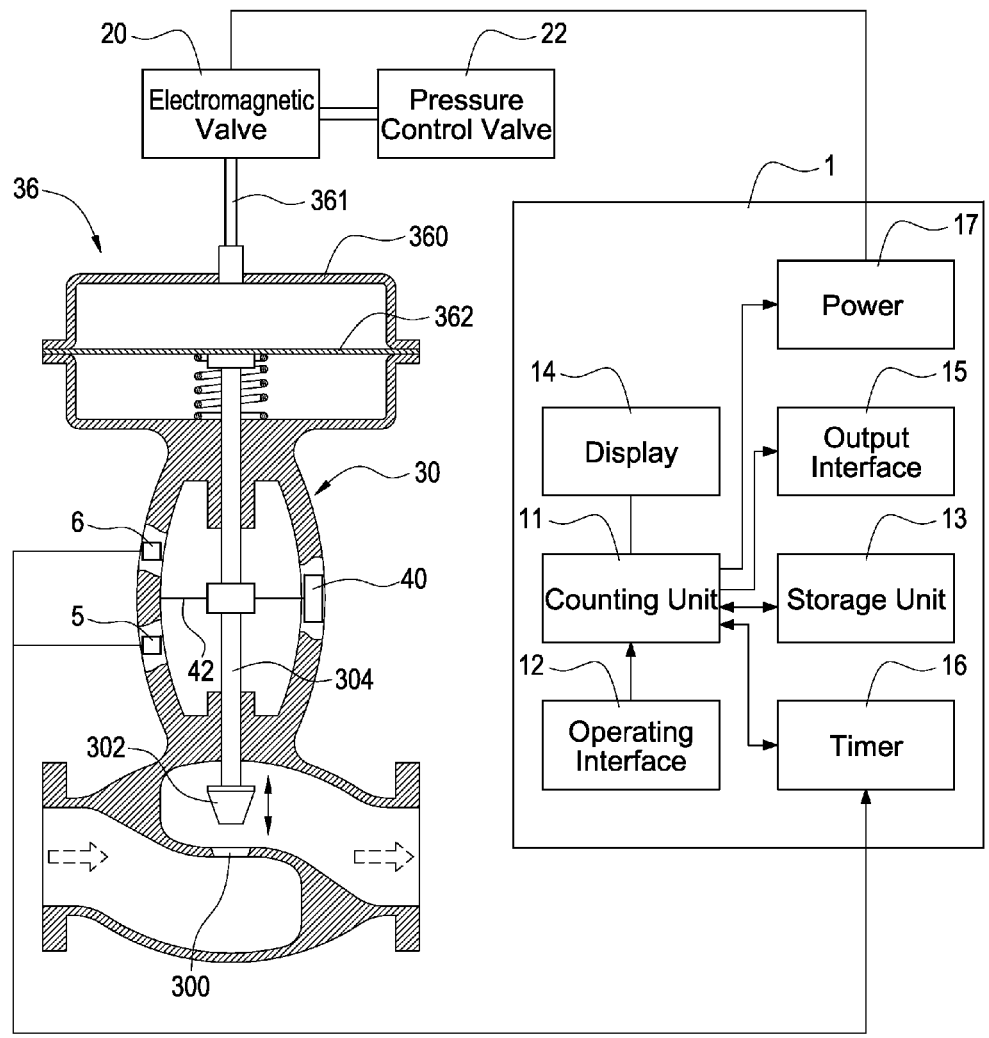
FIG. 1 is a connection schematic diagram of the inspector and the fluid control valve according to the present invention.

In cooperation with attached drawings, the technical contents and detailed description of the present invention are described thereinafter according to a preferable embodiment, being not used to limit its executing scope. Any equivalent variation and modification made according to appended claims is all covered by the claims claimed by the present invention.

FIG. 1 is a connection schematic diagram of the inspector and the fluid control valve according to the present invention. The inspector is used for inspecting switch time of the fluid control valve. The inspector 1 comprises a counting unit 11, an operating interface 12, a storage unit 13, a display 14, an output interface 15 and a timer 16. The counting unit 11 electrically connects to the operating interface 12, the storage unit 13, the display 14, the output interface 15 and the timer 16. The counting unit 11 is responsible for coordinating and instructing the data transfer and operation among the operating interface 12, the storage unit 13, the display 14, the output interface 15 and the timer 16.

The operating interface 12 electrically connects to the counting unit 11. The operating interface 12 is composed of a plurality of keys (hot shown in diagrams). The user inputs the basic data of the fluid control valve 1 to inspect via the operating interface 12.

The display 14, for example, is a LCD display and used for displaying data screen 120 (as shown in FIG. 2). In the embodiment, the columns on the data screen 120 may comprise a client name column 122, an engineer name column 124, a file name column 126, a number selection column 128 and a data input column 130. The data input column 130 further comprises a number selection column 1300, a brand selection column 1302, a serial number selection column 1304 and an action selection column 1306.

The fluid control valve 3, for example, is a pneumatic fluid control valve, which comprises a valve body 30 and a pneumatic module 32. The valve body 30 has a valve door 300, a valve core 302 and a rod 304. The valve core 302 connects to the bottom of the rod 304. When the valve core 302 and the valve door 300 are fitted, the fluid is blocked by the fluid control valve 3.

The pneumatic module 36 connects to the top of the rod 38, and is used for controlling the distance of the axis movement by the rod 38. The pneumatic module 36 comprises a chamber 360, a gas delivery tube 361, an electromagnetic valve 20 and a pressure control valve 22. A diaphragm 362 is disposed in the chamber 360. The top of the rod 38 connects to the diaphragm 362. The diaphragm 362 is deformed by air pressure applied and generates axis movement of the rod 38.

The chamber 360 interconnect the gas delivery tube 361, the electromagnetic valve 20 and the pressure control valve 22 which are communicating with the gas delivery tube 361. The pressure control valve 22 is disposed on the far side of the chamber 360, and is used for controlling the gas volume into the chamber 360. The electromagnetic valve 20 is disposed on the near side of the chamber 360, and is used for controlling if the gas is delivered into the chamber 360. The electromagnetic valve 20 electrically connects to the counting unit 11, and controls if the gas is delivered into the chamber 360 to deform the diaphragm 362 via the air pressure, which generates the axis movement of the rod 38 according to output signals from the counting unit 11. The electromagnetic valve 20 connects to power 17 of the inspector. The power 17 electrically connects to the counting unit 11. The power 17 provides the power to drive the electromagnetic valve 20.

The fluid control valve 3 further comprises an opening indicator 40 and a travel pointer 42. The opening indicator 40 is installed on the valve body 30. The travel pointer 42 connects to the rod 38. The rod 38 generates the axial shift which causes the movement of the travel pointer 42 and indicates on the opening indicator 40 that the fluid control valve 3 is opened.

The first limited switch 5 and the second limited switch 6 of the inspector 1 respectively installed on the valve body 30. The first limited switch 5 and the second limited switch 6 respectively positioned on the zero opening position and maximum opening position of the valve body 30. The line between the first limited switch 5 and the second limited switch 6 is parallel with the axis movement direction of the rod 304.

According to the present invention, when the valve core 102 and the valve door 300 contact each other, the travel pointer 42 contacts the first limited switch 5. In other words, when the valve door 300 has zero opening, the travel pointer 42 and the first limited switch 5 are in contact with each other. When the valve door 300 has maximum opening, the travel pointer 42 and the second limited switch 6 are in contact with each other. The first limited switch 5 and the second limited switch 6 electrically connects to the timer 16. The timer 16 is used for counting the time where the travel pointer 42 moves from the first limited switch 5 (or the second limited switch 6) to the second limited switch 6 (or the first limited switch 5).

When fluid control valve 3 is closed (i.e. the valve core 302 and the valve door are in contacts with each other). When the travel pointer 42 moves away from the first limited switch 5, the timer 16 starts working. When the travel pointer 42 contacts the second limited switch 6, the timer 16 stops working. When the fluid control valve 3 has maximum opening and the travel pointer 42 moves away from the second limited switch 6, the timer 16 starts working. When travel pointer 42 contacts the first limited switch 5, the timer 16 stops working. It should be noted that, if the counting unit 11 of the inspector 1 provides timing function directly. Accordingly, it is not required to offer a timer 16, and the first limited switch 5 and the second limited switch 6 respectively electrically connect to the counting unit 11.

The steps for inspecting the switch time of the fluid control valve 3 are described in the following:

Firstly, provide an inspector 1, which comprises a counting unit 11, a first limited switch 5 and a second limited switch 6. The first limited switch 5 and the second limited switch 6 are installed on the valve body 30 of the fluid control valve 3, and are respectively and electrically connect to the counting unit.

Next, the inspector 3 displays a data creating screen. The data creating screen may comprise a client name column 122, an engineer name column 124, a file name column 126, a number selection column 128 and a data input column 130. The data input column 130 may further comprise a number selection column 1300, a brand selection column 1302, a serial number selection column 1304 and an action selection column 1306.

Next, the inspecting person inputs corresponding basic data of the fluid control valve 3 via an operating interface 15. The basic data must comprise operating conditions of the fluid control valve 3. Normally, the operating conditions of the fluid control valve 3 comprise two categories Failure to Open (FO) operating conditions and Failure to Close (FC) operating conditions.

Under FO operating conditions, the diaphragm 362 in the pneumatic module 36 only blocks the valve door 306 when deformed by applied force. Accordingly, FO operating conditions are also known as Air to Close operating conditions. As shown in FIG. 2, the fluid control valve 3 is a fluid control valve with Air to Close operating conditions.

Under FO operating conditions, the valve core 302 and the valve door 300 are in contact with each other before the diaphragm 362 of the pneumatic module 36 is deformed by applied force. In other words, when a force applied on the diaphragm 362, the rod 304 is lifted to cause the valve core 302 moving away from the valve door 300, and then the fluid is allowed to flow through the fluid control valve 3. Accordingly, the FC operating conditions are also known as Air to Open operating conditions.

Consequently, the electromagnetic valve 20 is driven to start timing when the travel pointer 42 moves away from the first limited switch 5, and to stop timing when the travel pointer 42 contacts the second limited switch 6. Or, the timing starts when the travel pointer 42 moves away from the second limited switch 6, the timing stops when the travel pointer 42 contacts the first limited switch 5. In addition, the display 14 of the inspector 1 displays the basic data and the operating time.

Lastly, as shown in FIG. 3, the basic data and the operating time are processed and output to be a report with the information including the basic data and the operating time shown on the output interface.

As the skilled person will appreciate, various changes and modifications can be made to the described embodiment. It is intended to include all such variations, modifications and equivalents which fall within the scope of the present invention, as defined in the accompanying claims.

What is claimed is:

1. A method of inspecting switching time with a fluid control valve, used for inspecting operating time of a fluid control valve, the fluid control valve comprising a valve body and a pneumatic module installed on the valve body, a rod and a valve door disposed in the valve body, a travel pointer disposed on the rod, and a valve core connected to the bottom of the rod, the pneumatic module comprising a chamber, an electromagnetic valve and a pressure control valve, a diaphragm is disposed in the chamber, the top of the rod connected to the diaphragm, the pressure control valve interconnected with the chamber, the electromagnetic valve disposed between the chamber and the pressure control valve, the method of inspecting switching time with fluid control valve comprising:
   a) providing an inspector, the inspector comprising a counting unit, a power, a first limited switch and a second limited switch, the counting unit electrically connected to the pressure control valve, the power electrically connected to the counting unit and the electromagnetic valve, the first limited switch and the second limited switch disposed on the valve body electrically connected to the counting unit;
   b) inputting basic data of the fluid control valve, the basic data comprising operating conditions of the fluid control valve;
   c) driving the electromagnetic valve and starting to count time upon the travel pointer moving away from the first limited switch;
   d) stopping counting time upon the travel pointer touching the second limited switch; and
   e) recording the operating time.

2. The method of inspecting switching time with fluid control valve of claim 1, further comprising a step:
   f) displaying the operating time.

3. The method of inspecting switching time with fluid control valve of claim 2, further comprising a step prior to step b):
   b0) displaying a data creating screen creating screen.

4. The method of inspecting switching time with fluid control valve of claim 1, further comprising a step:
   g) displaying the basic data and the operating time.

5. The method of inspecting switching time with fluid control valve of claim 4, further comprising a step prior to step b):
   b0) displaying a data creating screen.

6. The method of inspecting switching time with fluid control valve of claim 5, wherein the data creating screen comprises a engineer name column, a file name column, a number selection column and a data input column, the data input column comprises a number selection column, a brand selection column, a serial number selection column and an action selection column.

7. The method of inspecting switching time with fluid control valve of claim 5, wherein the inspector further comprises a display and an operating interface, the display and the operating interface respectively and electrically connects to the counting unit, the display is used for displaying the basic data, the data creating screen and the operating time, the operating interface is used for inputting the basic data.

8. The method of inspecting switching time with fluid control valve of claim 6, further comprising an output interface, electrically connecting to the counting unit, the output device is used for saving the basic data and a report of the operating time.

9. The method of inspecting switching time with fluid control valve of claim 5, wherein the inspector further comprises a timer disposed between the counting unit and the first limited switch and the second limited switch, and electrically connects to the counting unit, the first limited switch and the second limited switch are used for counting the operating time.

10. The method of inspecting switching time with fluid control valve of claim 1, wherein a line between the first limited switch and the second limited switch is parallel with an axis movement direction of the rod.

* * * * *